Figures 1, 2:
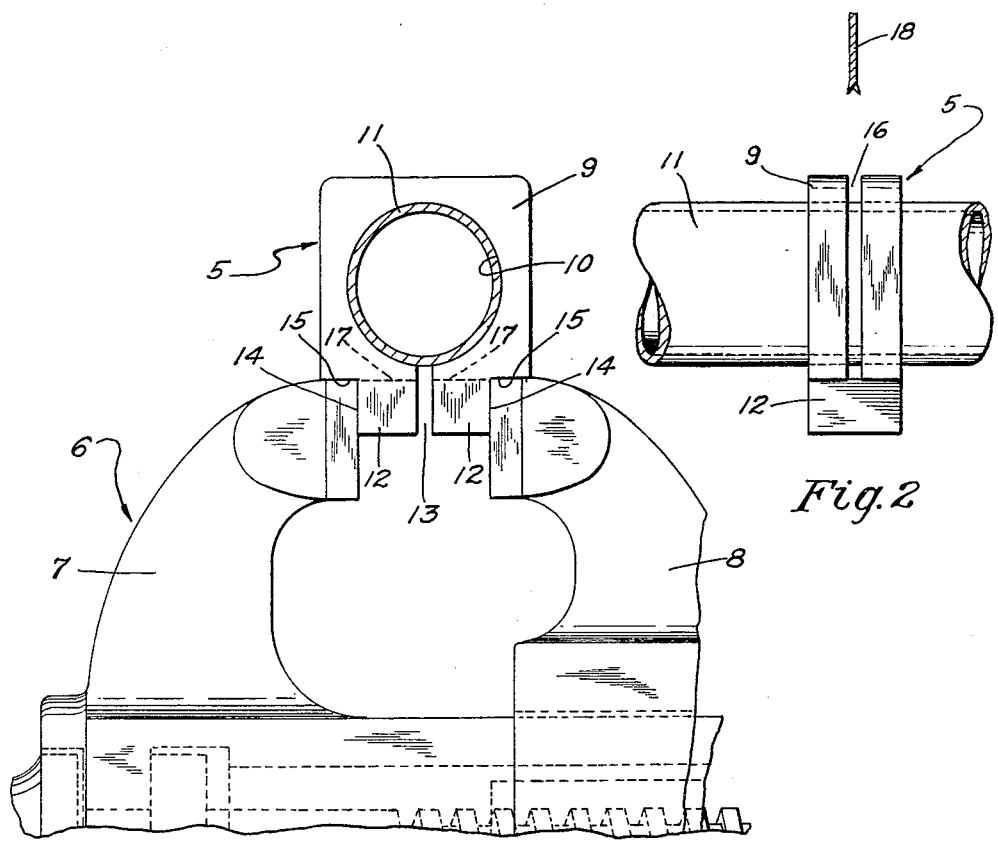

June 26, 1934.  J. R. COE  1,964,194
SAWING JIG
Filed June 29, 1933

INVENTOR
James R. Coe
BY
Wooster Davis
ATTORNEYS

Patented June 26, 1934

1,964,194

UNITED STATES PATENT OFFICE 1,964,194

SAWING JIG

James R. Coe, Watertown, Conn., assignor to The American Brass Company, Waterbury, Conn., a corporation of Connecticut Application June 29, 1933, Serial No. 678,216

2 Claims. (Cl. 29—67)

This invention relates to new and useful improvements in jigs and has for an object to provide a light portable jig or fixture in which a thin walled copper or similar tube may be clamped and sawed without distortion.

Another object is to provide a jig or fixture as stated and which provides a guide for a saw blade whereby to insure a straight cut at right angles to the axis of a tube being cut while clamped in the jig or fixture.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a side elevational view showing the jig or fixture of the present invention in place in a vise and clamping a tube in position for cutting; and Fig. 2 is an elevational view at right angles to Fig. 1, the vise being omitted.

The jig or fixture of the present invention is primarily intended for use in sawing to proper length pieces of thin walled tubing when such sawed lengths are to be soldered into pipe fittings such for example as disclosed in my application Serial No. 654,593, filed February 1, 1933. Any distortion of the tube would make it very difficult to enter the tube into the fitting as taught in said application, and such distortion of the tube would destroy the uniformity of space provided for solder between the tube and a fitting. The present invention provides means whereby thin walled tubing may be cut to desired lengths without distortion of the tubing.

Referring in detail to the drawing the improved jig or fixture is generally designated 5 and in Fig. 1 is shown in operative position in a clamping or pressure applying means indicated as any vise 6 having the jaws 7 and 8 adjustable toward and from one another. The jig or fixture 5 includes a body 9 which may be formed from a single block of metal and through such body 9 there is provided an opening 10 to receive a piece of thin walled copper or similar tubing 11 which is to be cut into lengths.

On one side or edge body 9 carries an extension 12 through which is provided a slot 13, the said slot passing through the extension and into the tube receiving opening 10 whereby the extension is divided into two parts. If desired, the extension may be reduced to provide shoulders 14 and 15 of which the shoulders 14 are adapted to be engaged by the clamping jaws of the vise while the shoulders 15 rest against the upper surface of the vise jaws and position the fixture in the jaws.

From the foregoing, it will be understood that as the slot 13 extends entirely through the extension 12 and enters the opening 10 the body 9 is made adjustable as the metal is somewhat resilient so that when pressure is applied to the outer surface or shoulders 14 of the extension the parts of the extension may be forced toward one another partially closing the slot 13. When this is done the diameter of the opening 10 will be slightly reduced so that if a piece of tubing has been inserted into said opening the tubing will be firmly clamped in place when pressure is applied to the extension in the manner described. It will be noted when the tube is so clamped its walls within the opening 10 are supported by the walls of this opening and uniformly throughout the circumference of the tube.

Slot 13 extends for the length of the body 9 and in the direction of the longitudinal axis of the opening 10. A slot 16 is also provided and this slot 16 extends entirely through the body from its outer or upper edge to the extension 12, the inner or lower limit of slot 16 being indicated by the dotted lines 17 in Fig. 1. It is particularly noted that slot 16 is here shown as at right angles to the slot 13 and slot 16 is likewise normal to the longitudinal axis of the opening 10 through the body.

When a piece of tubing of any desired length is to be cut from a piece of greater length then the piece of greater length is inserted into the opening 10 in the body 9 of the fixture and the fixture slid along the tubing to the desired location. The point at which the tubing is to be cut is located opposite the slot 16 and then pressure is applied to the outer surfaces or shoulders 14 of the extension 12 whereby to force the parts of said extension toward one another in a manner to reduce the width of the slot 13 through said extension. As above explained this also reduces the diameter of the tube receiving opening 10 with the result that the inserted tubing 11 is firmly clamped in place and its walls supported.

The pressure applied to the extension 12 may be applied by the jaws of a vise as suggested in the drawing. The pressure of the vise jaws not only clamps the fixture about the tubing so as to hold the tubing but this pressure of the jaws at the same time holds the fixture and tubing in convenient position for sawing the tube in two. The operation of the vise jaws therefore performs both operations simultaneously. It is noted that the extension is disposed between the jaws 7 and 8 of the vise 6 and that the shoulders 15 rest on the outer surfaces of the vise jaws forming vertical supports and limiting means. When the vise is tightened the entire fixture and tube is held in place. With the parts thus positioned a cutting means as for example the saw indicated at 18 in Fig. 2 may be entered in the slot 16 and operated to cut through the tubing. This slot operates as a guide for the saw insuring a square, straight cut at right angles to the axis of the tube.

As the tubing is clamped in place and supported for its entire circumference the cut will be made without distortion whereby the cut ends of the tubing will be satisfactory in the forming of joints according to the teaching of my copending application above referred to. Attention is directed to the fact that the fixture or jig comprises but a single piece so that there is nothing to get out of order and the device may therefore be used indefinitely. Also, it is noted that the improved jig is relatively light so that it is easily portable and may be transported to any particular job and that the jig may be operated to clamp the work by any pressure applying means whether a vise or otherwise.

Having thus set forth the nature of my invention, what I claim is:

1. A jig comprising a single block of metal having an opening formed therethrough to receive a length of pipe and of a size to accurately fit the wall of the pipe, said block having a saw guide slot extending partially therethrough and transversely from one side of the block to intersect said opening, and said block having an extension on the opposite side of the opening from said slot, said extension having a slot extending longitudinally of the axis of the opening and from the outer side thereof to the opening whereby on the application of pressure on the extension on opposite sides of said latter slot the walls of the block at each side of the opening may be forced toward one another to clamp a pipe in the opening, and said extension having walls on the outer surfaces thereof on opposite sides of the slot to form seats for the walls of vise jaws to apply said pressure and support the block.

2. A jig comprising a one piece block of metal having an opening formed therethrough to receive and fit a length of pipe, said block having a slot extending longitudinally of the axis of the opening and extending from the outer side of the block to said opening, said block being recessed in its outer walls on opposite sides of said slot forming substantially parallel shoulders extending from one edge of the block to form seats for the jaws of a vise, and other shoulders spaced inwardly from said edge extending outwardly in opposite directions from the first shoulders to the opposite side walls of the block to seat on top of said vise jaws, and said block having a saw guide slot extending from the opposite side of the block from the first slot across the opening in a plane transverse to the axis of the opening.

JAMES R. COE.